(12) United States Patent
Liu

(10) Patent No.: US 7,841,440 B2
(45) Date of Patent: Nov. 30, 2010

(54) FUEL SAFETY CONTROL APPARATUS FOR VEHICLE

(75) Inventor: Chuan Liu, Tainan Hsien (TW)

(73) Assignee: Southern Taiwan University, Yungkang, Tainan Hsien (TW)

( * ) Notice: Subject to any disclaimer, the term of this patent is extended or adjusted under 35 U.S.C. 154(b) by 352 days.

(21) Appl. No.: 12/079,162

(22) Filed: Mar. 25, 2008

(65) Prior Publication Data

US 2009/0038872 A1    Feb. 12, 2009

(30) Foreign Application Priority Data

Aug. 7, 2007    (TW) .............................. 96128966 A

(51) Int. Cl.
  *B60K 28/10* (2006.01)
(52) U.S. Cl. ................... 180/274; 180/282; 180/284
(58) Field of Classification Search ............... 180/274, 180/277, 282, 284
See application file for complete search history.

(56) References Cited

U.S. PATENT DOCUMENTS

| 4,851,705 | A |   | 7/1989 | Musser et al. ............... 307/10.1 |
| 5,706,967 | A |   | 1/1998 | Weh et al. ............... 220/203.01 |
| 5,796,177 | A |   | 8/1998 | Werbelow et al. ........... 307/10.1 |
| 7,086,493 | B2 |   | 8/2006 | Knight ........................ 180/274 |
| 2002/0020397 | A1 | * | 2/2002 | Begley et al. ................ 123/497 |

* cited by examiner

*Primary Examiner*—Eric Culbreth
(74) *Attorney, Agent, or Firm*—Charles E. Baxley

(57) ABSTRACT

A fuel safety control device includes a fuel pump disposed in a fuel tank and coupled to a vehicle engine with a fuel piping system, a fuel system safety controller coupled to the fuel pump for controlling the driving direction of the fuel pump, and an impact detector coupled to the fuel system safety controller for supplying an impact signal to the fuel system safety controller and to reverse the driving direction of the fuel pump, and to draw the fuel from the fuel piping system back to the fuel tank when receiving an impact signal, in order to prevent the impact firing from being occurred. A transformer circuit may be coupled to the fuel pump for increasing the driving speed of the fuel pump when required.

16 Claims, 11 Drawing Sheets

FUEL SAFETY CONTROL APPARATUS FOR VEHICLE

BACKGROUND OF THE INVENTION

1. Field of the Invention

The present invention relates to a fuel safety control apparatus for a vehicle, and more particularly to a fuel safety control apparatus including a safety device for returning or drawing the fuel from the fuel piping or tubing system back to the fuel tank when a vehicle impact is occurred and for preventing the impact firing from being occurred or generated.

2. Description of the Prior Art

Typical vehicles comprise a fuel pump coupled to a fuel tank with a fuel piping or tubing system for pumping and pressurizing or supplying the fuel to the engines.

When a vehicle impact or a vehicle crash is occurred, many developments have been developed and focused on protecting or locking the vehicle fuel tanks.

For example, U.S. Pat. No. 5,706,967 to Web et al. discloses one of the typical safety locks, especially for vehicle fuel tanks and for preventing the fuel from leaking.

However, the fuel contained in the fuel piping or tubing system may also flow out of the fuel piping or tubing system after the vehicle impact or crash, but the typical safety devices may not be used to return or draw the fuel from the fuel piping or tubing system back to the fuel tank when a vehicle impact is occurred such that the impact firing also may not be prevented from being occurred or generated.

U.S. Pat. No. 7,086,493 to Knight discloses another typical fuel system comprising vehicle impact shutoff and comprising a fuel control module adapted to cease fuel pump operation in response to an impact signal without requiring a signal from the engine control module.

However, similarly, the fuel control module may only be used to cease fuel pump operation in response to an impact signal, but also may not be used to return or draw the fuel from the fuel piping or tubing system back to the fuel tank when a vehicle impact is occurred such that the impact firing also may not be prevented from being occurred or generated.

U.S. Pat. No. 4,851,705 to Musser et al., and U.S. Pat. No. 5,796,177 to Werbelow et al. discloses two of the typical firing circuits for a vehicle passenger restraint system, such as air bags or seat belt tensioning devices, and the typical firing circuits should include one or more initiators or impact detectors for generating an impact signal to actuate or operate the air bags or seat belt tensioning devices. These two prior arts are cited for showing that the impact signals may be detected and obtained by such as impact detectors for actuating or operating the air bags or seat belt tensioning devices.

The present invention has arisen to mitigate and/or obviate the afore-described disadvantages of the conventional fuel safety control devices for vehicles.

SUMMARY OF THE INVENTION

The primary objective of the present invention is to provide a fuel safety control apparatus including a safety device for returning or drawing the fuel from the fuel piping or tubing system back to the fuel tank when a vehicle impact is occurred and for preventing the impact firing from being occurred or generated.

In accordance with one aspect of the invention, there is provided a fuel safety control apparatus comprising a fuel tank including a chamber formed therein for receiving a fuel therein, a fuel pump disposed in the chamber of the fuel tank and coupled to a vehicle engine with a fuel piping system for pumping the fuel to the vehicle engine, a fuel system safety controller coupled to the fuel pump for controlling and changing a driving direction of the fuel pump, and an impact detector coupled to the fuel system safety controller for selectively supplying an impact signal to the fuel system safety controller and to reverse the driving direction of the fuel pump, and to draw the fuel from the fuel piping system back to the fuel tank when a vehicle impact is occurred, and thus to prevent the fuel from leaking after the vehicle crash.

The fuel pump includes a housing having a compartment formed therein, and having an inlet port communicating with the compartment of the housing for allowing the fuel in the chamber of the fuel tank to be drawn into the compartment of the housing, an impeller rotatably disposed in the compartment of the housing for pumping the fuel into and out of the housing, and the housing includes an outlet port coupled to the vehicle engine with the fuel piping system.

The housing includes a first opening formed therein and communicating with the compartment of the housing, and the fuel piping system includes a first pipe coupled to the outlet port of the housing and coupled to the vehicle engine. The fuel piping system further includes a manifold coupled between the first pipe and the first opening of the housing for allowing the fuel to be selectively drawn back from the first pipe into the compartment of the housing.

The fuel piping system includes a second pipe coupled to the vehicle engine and having a free end engaged into the chamber of the fuel tank for selectively supplying the fuel back into the chamber of the fuel tank.

The housing includes a second opening formed therein and communicating with the compartment of the housing, and the fuel piping system includes a third pipe coupled between the second pipe and the second opening of the housing for allowing the fuel to be drawn back from the second pipe into the compartment of the housing.

The housing includes a valve seat formed therein and communicating with the compartment of the housing and the and the first and the second openings of the housing, and a valve member for selectively engaging with the valve seat and for selectively blocking and closing the first and the second openings of the housing.

The fuel piping system includes a check valve engaged in the free end of the second pipe for selectively blocking and closing the free end of the second pipe and for preventing the fuel from flowing back into the second pipe from the chamber of the fuel tank. The fuel piping system includes a pressure regulator coupled between the vehicle engine and the second pipe for controlling the fuel to flow into the second pipe.

The pressure regulator includes a casing having a space formed therein, the first pipe and the second pipe are coupled to the space of the casing for allowing the fuel to selectively flow from the first pipe to the second pipe, a valve piece, and a pressure regulator controller for actuating the valve piece to control the fuel to flow from the first pipe to the second pipe.

The pressure regulator includes a flexible membrane disposed in the casing, the valve piece is attached to the flexible membrane for selectively blocking the second pipe. The pressure regulator includes a spring member disposed in the casing and engaged with the flexible membrane for forcing the valve piece to engage with the second pipe.

The pressure regulator controller includes a core disposed in the casing and aligned with the valve piece, and a coil engaged around the core for actuating the core to attract and to move the valve piece relative to the second pipe. A relay may further be provided and coupled between the pressure regulator controller and the fuel system safety controller for controlling the pressure regulator controller to actuate the valve piece.

The housing includes a check valve engaged in the outlet port of the housing for selectively blocking and closing the outlet port of the housing. Another relay may further be provided and coupled between the fuel system safety controller and the fuel pump for controlling the driving direction of the fuel pump.

The fuel system safety controller includes a transformer circuit coupled to the fuel pump for selectively supplying an increased power to the fuel pump and for increasing the rotational speed of the fuel pump, and a relay coupled to the transformer circuit for selectively switching off the transformer circuit.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
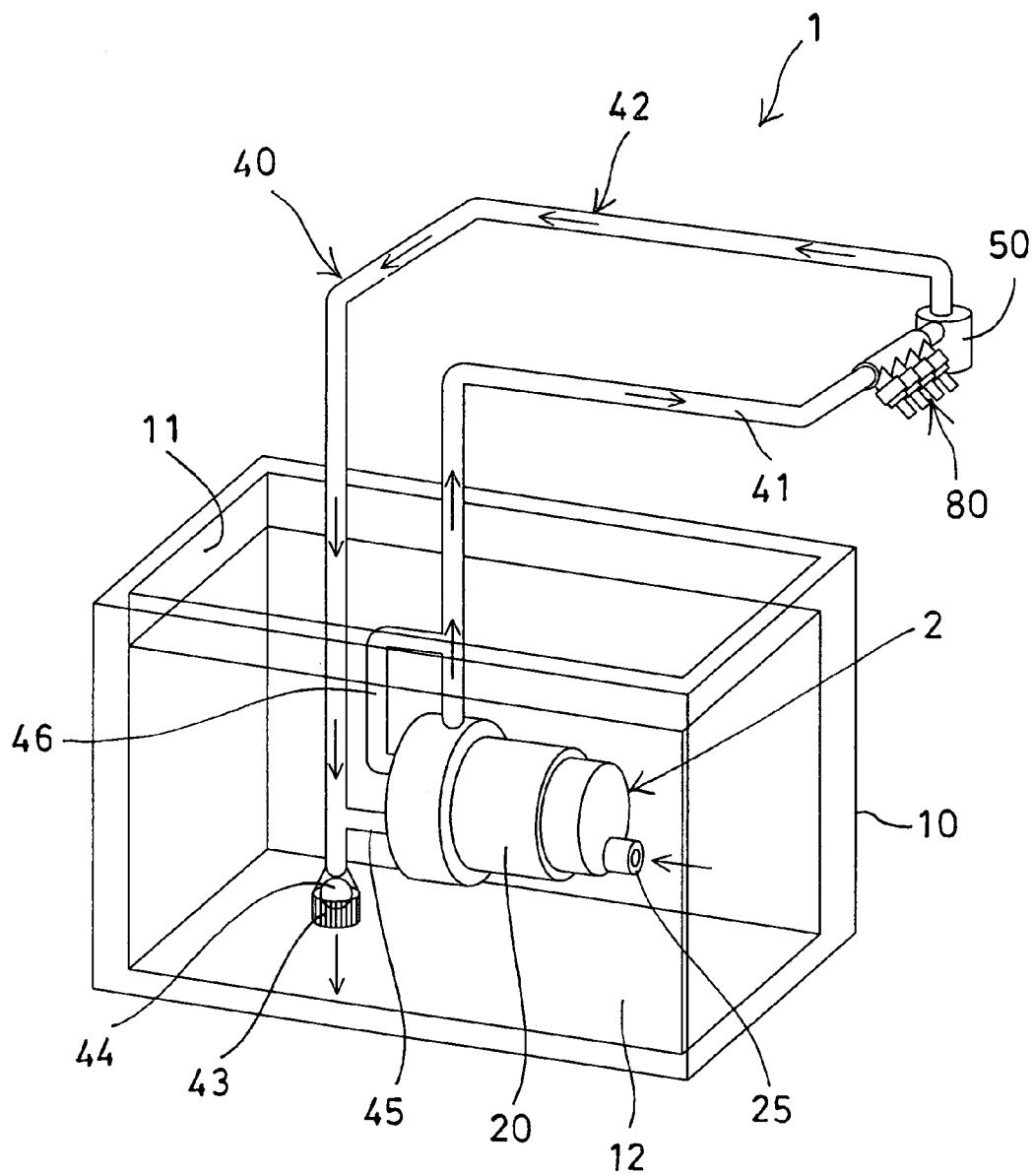
FIG. 1 is a partial perspective view of a fuel pumping system for a fuel safety control apparatus in accordance with the present invention.
Figure 2:
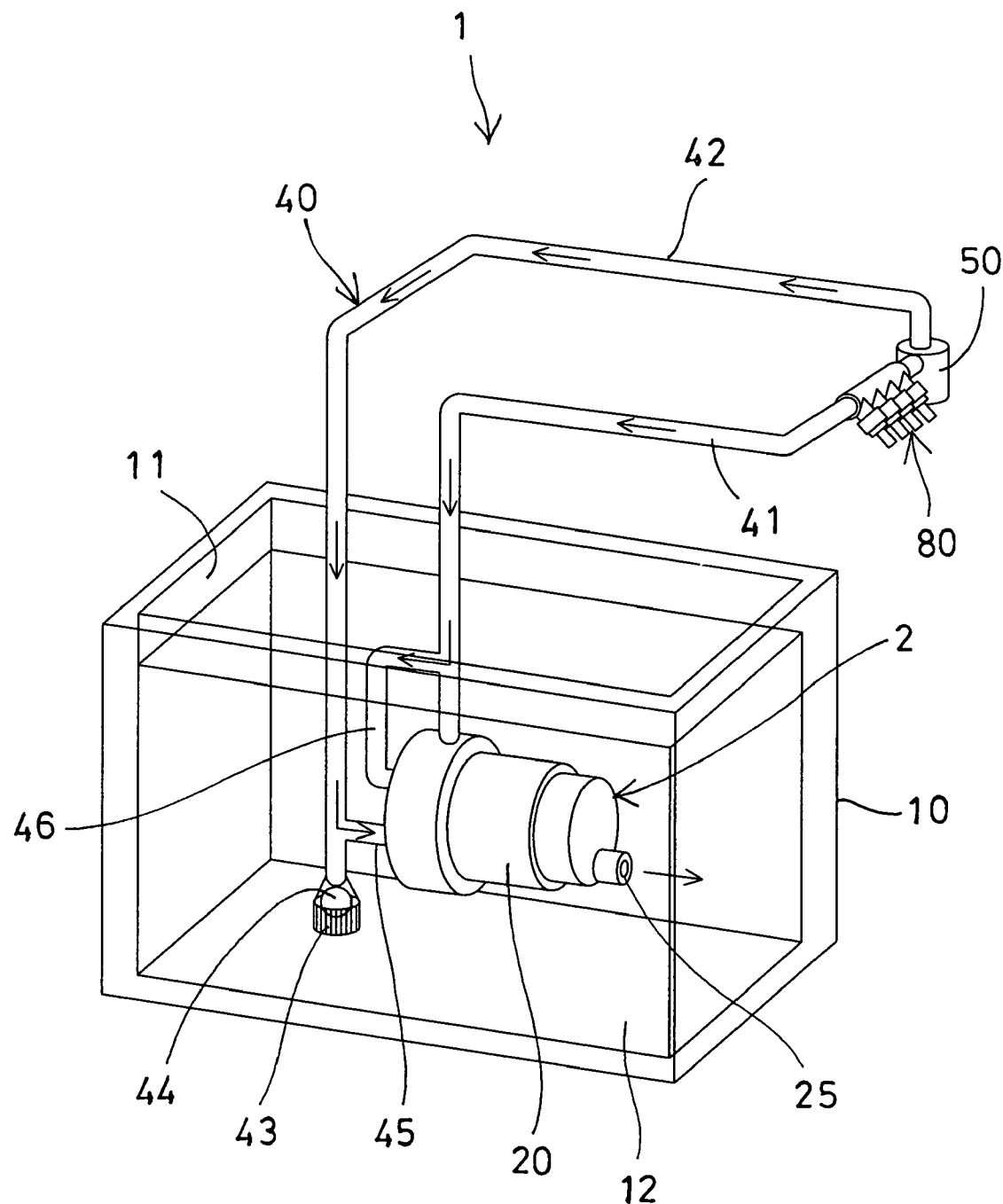
FIG. 2 is a partial perspective view similar to FIG. 1, illustrating the operation of the fuel pumping system.

Referring to the drawings, and initially to FIGS. 1-2, a fuel pumping system 1 in accordance with the present invention is illustrated and comprises a fuel tank 10 including a chamber 11 formed therein for receiving a fuel 12 therein, and a fuel pump 2 disposed or engaged within the chamber 11 of the fuel tank 10 and coupled to a vehicle engine 80 with a fuel piping or tubing system 40 for pumping and pressurizing or supplying the fuel 12 to the vehicle engine 80. For example, as shown in FIGS. 3 and 4, the fuel pump 2 includes a housing 20 having a compartment 21 formed therein, a rotating member or impeller 22 rotatably disposed or engaged or supported within the compartment 21 of the housing 20 with a spindle 23 and one or more bearings 24 for pumping the fuel 12 into and out of the housing 20.

Figure 3:
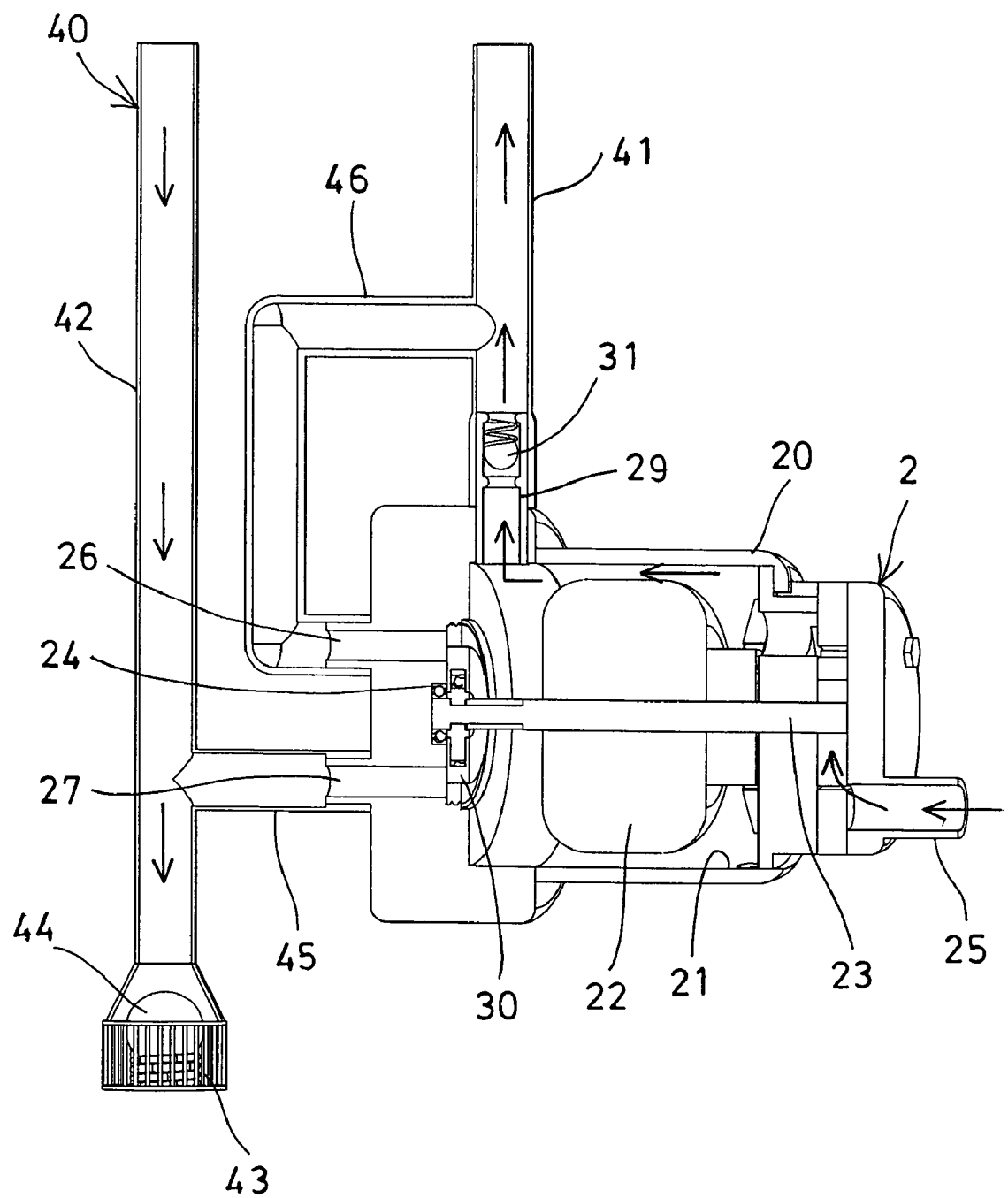
FIG. 3 is a partial cross sectional view of the fuel pump for the fuel safety control apparatus.
Figure 4:
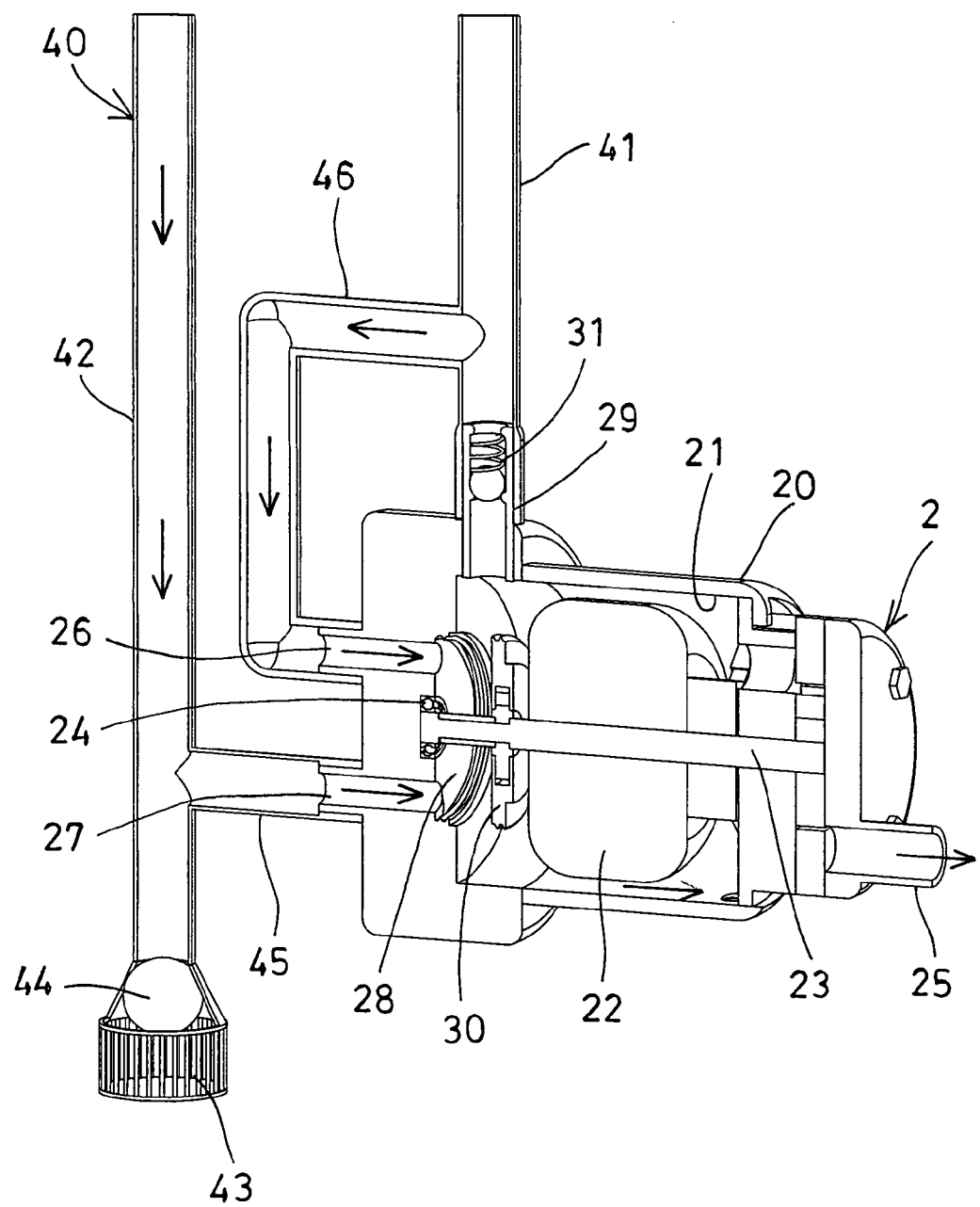
FIG. 4 is a partial cross sectional view similar to FIG. 3, illustrating the operation of the fuel pump for the fuel safety control apparatus.

The housing 20 includes an inlet port 25 communicating with the compartment 21 of the housing 20 for allowing the fuel 12 in the chamber 11 of the fuel tank 10 to be pumped or drawn into the compartment 21 of the housing 20 with the impeller 22 (FIG. 3), and includes two openings 26, 27 formed therein and also communicating with the compartment 21 of the housing 20 for coupling to the fuel piping system 40 and for allowing the fuel 12 to be selectively drawn and flown back into the compartment 21 of the housing 20 by the impeller 22 (FIG. 4), and includes a depression or valve seat 28 formed therein and communicating with the compartment 21 of the housing 20 and the openings 26, 27 of the housing 20 for selectively receiving a valve member 30 which may selectively block or close the openings 26, 27 of the housing 20 (FIG. 3).

The housing 20 further includes an outlet port 29 coupled to a first or outward pipe 41 of the fuel piping system 40 which is then coupled to the vehicle engine 80, and then coupled to a pressure regulator 50, and then coupled to a second or inward pipe 42 of the fuel piping system 40, in which the second or inward pipe 42 of the fuel piping system 40 includes a free end 43 engaged into the chamber 11 of the fuel tank 10 for selectively supplying the fuel 12 back into the chamber 11 of the fuel tank 10 (FIG. 3). A check valve 44 may be disposed or engaged into the free end 43 of the second or inward pipe 42 of the fuel piping system 40 for selectively blocking or closing the free end 43 of the second or inward pipe 42 (FIG. 4) and for preventing the fuel 12 from flowing back into the second or inward pipe 42 and the pressure regulator 50.

The fuel piping system 40 further includes a third or return pipe 45 coupled between the second or inward pipe 42 and one of the openings 27 of the housing 20 for allowing the fuel 12 to be selectively drawn and flown back from the second or inward pipe 42 into the compartment 21 of the housing 20 by the impeller 22 (FIG. 4) when the valve member 30 is disengaged from the valve seat 28 of the housing 20, and includes a manifold 46 coupled between the first or outward pipe 41 and the other opening 26 of the housing 20 for allowing the fuel 12 to be selectively drawn and flown back from the first or outward pipe 41 into the compartment 21 of the housing 20 by the impeller 22 when the valve member 30 is disengaged from the valve seat 28 of the housing 20.

Another check valve 31 may be disposed or engaged into the outlet port 29 of the housing 20 and/or the first or outward pipe 41 for selectively blocking or closing the first or outward pipe 41 (FIG. 4) and for preventing the fuel 12 from flowing back from the first or outward pipe 41 and the pressure regulator 50 into the compartment 21 of the housing 20. In operation, as shown in FIGS. 1 and 3, when the valve member 30 is engaged into or with the valve seat 28 of the housing 20, the openings 26, 27 of the housing 20 may be blocked or closed by the valve member 30, and the fuel 12 in the chamber 11 of the fuel tank 10 may be pumped or drawn into the compartment 21 of the housing 20 with the impeller 22, and then to flow through the first or outward pipe 41 and into the vehicle engine 80 and then into the pressure regulator 50 and then to selectively flow back into the chamber 11 of the fuel tank 10.

As shown in FIGS. 2 and 4, when an impact signal is detected and obtained, such as for actuating or operating the air bags or seat belt tensioning devices, the impeller 22 may be actuated or operated reversely or in the reverse direction, and the valve member 30 may be disengaged from the valve seat 28 of the housing 20, and the check valves 31, 44 may be actuated or operated to block or close the first or outward pipe 41 and the second or inward pipe 42, and the fuel 12 in the first or outward pipe 41 and the second or inward pipe 42 of the fuel piping system 40 may be pumped or drawn through the manifold 46 and the third or return pipe 45 respectively and then into the compartment 21 of the housing 20 with the impeller 22.

Figure 11:
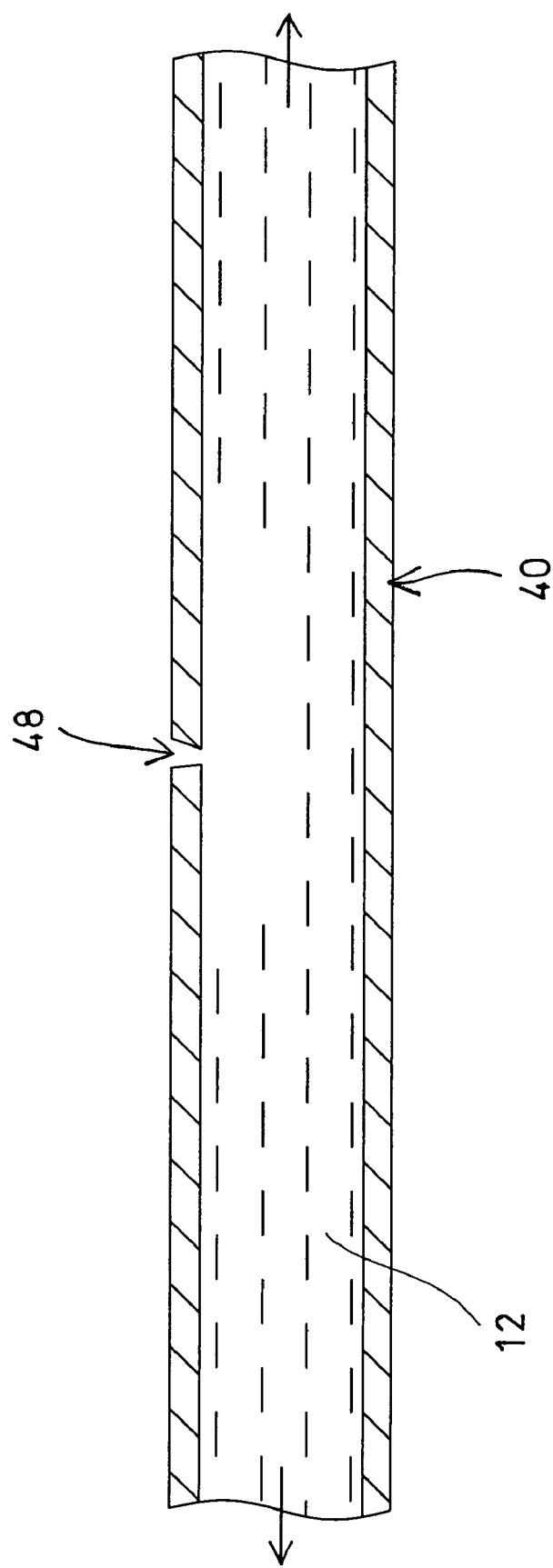
FIG. 11 is a partial cross sectional view illustrating the broken condition of the fuel piping or tubing system for the vehicle engine.

As shown in FIG. 11, when either or both of the first or outward pipe 41 and the second or inward pipe 42 of the fuel piping system 40 include one or more broken portions or orifices 48 formed or generated after the vehicle impact or crash, the fuel 12 in either or both of the first or outward pipe 41 and the second or inward pipe 42 of the fuel piping system 40 may be pumped or drawn in both the opposite directions through the manifold 46 and the third or return pipe 45 respectively and then into the compartment 21 of the housing 20, such that the fuel 12 may be forcefully and effectively drawn back into the compartment 21 of the housing 20 and then into the chamber 11 of the fuel tank 10 by the impeller 22.

Figure 5:
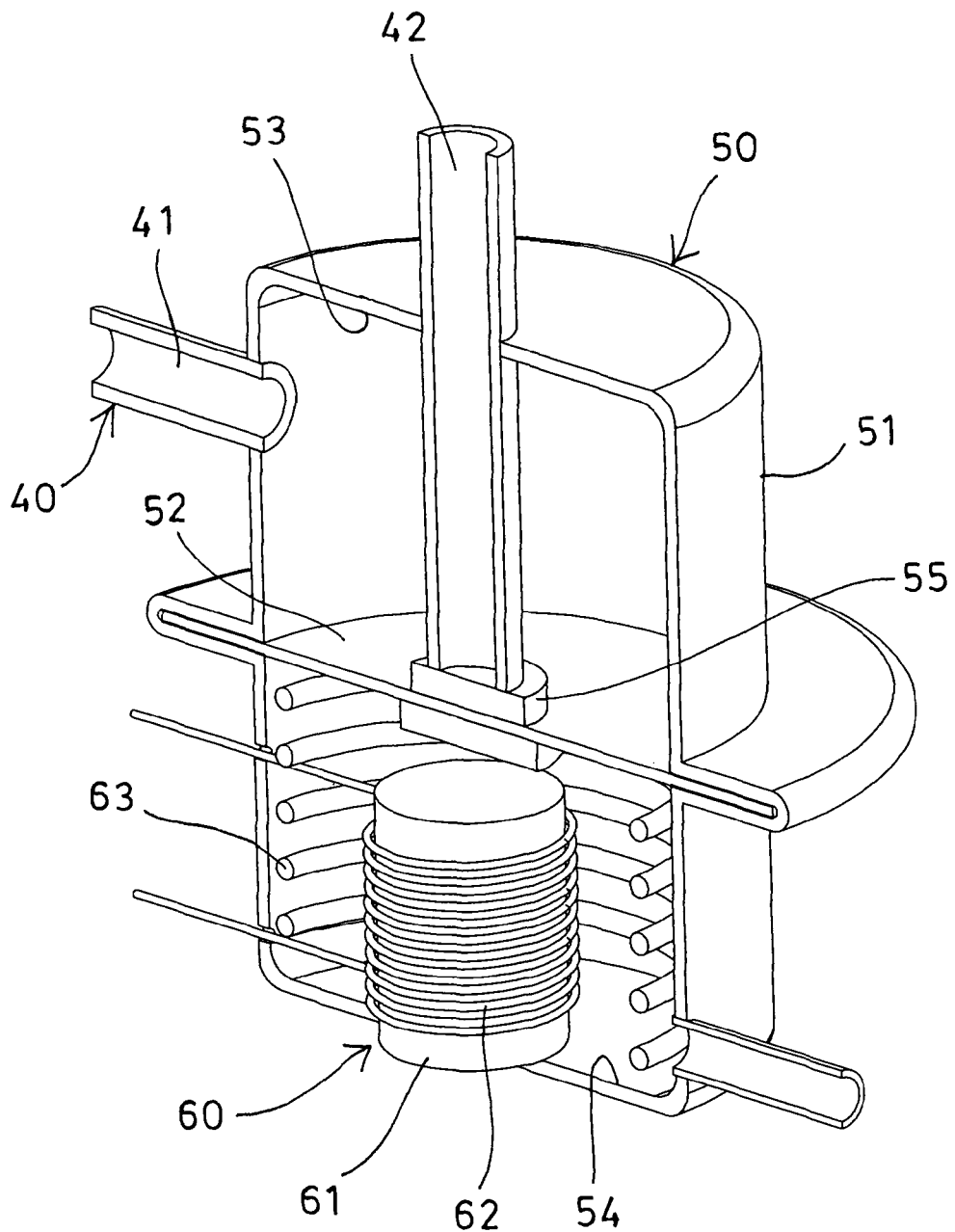
FIG. 5 is a partial cross sectional view of the pressure regulator for the fuel safety control apparatus.
Figure 6:
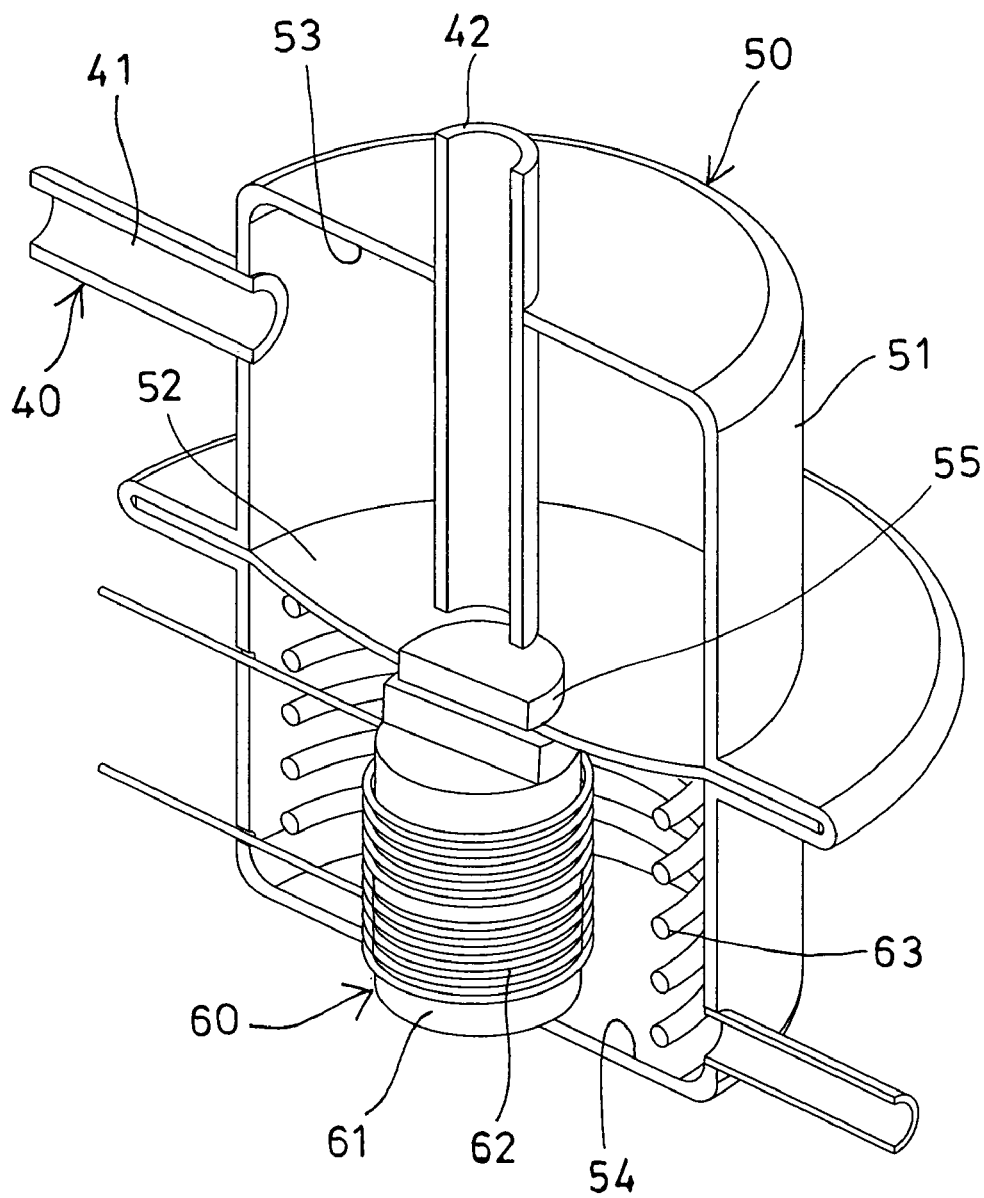
FIG. 6 is a partial cross sectional view similar to FIG. 5, illustrating the operation of the pressure regulator for the fuel safety control apparatus.

Referring next to FIGS. 5 and 6, the pressure regulator 50 includes a casing 51, and a flexible film or membrane 52 disposed or engaged or secured in the middle portion of the casing 51 for separating the interior of the casing 51 into two spaces 53, 54, in which the first or outward pipe 41 and the second or inward pipe 42 of the fuel piping system 40 are coupled to or engaged into one of the spaces 53 of the casing 51 for allowing the fuel 12 to be selectively flown between the first or outward pipe 41 and the second or inward pipe 42 of the fuel piping system 40, the pressure regulator 50 further includes a valve piece 55 attached or secured to the flexible membrane 52 for selectively engaging with the second or inward pipe 42 (FIG. 5) and for selectively blocking or closing the second or inward pipe 42.

A pressure regulator control means or controller 60 is disposed or engaged into the other space 54 of the casing 51 for controlling the engagement of the valve piece 55 with the second or inward pipe 42. For example, the pressure regulator controller 60 includes a core 61 disposed in the casing 51 and disposed below or aligned with the valve piece 55, and a coil 62 engaged around the core 61 for selectively actuating the core 61 to attract or to move the valve piece 55 away from the second or inward pipe 42 (FIG. 6), and a spring member 63 may also be disposed or engaged into the other space 54 of the casing 51 and engaged with the flexible membrane 52 for selectively moving or forcing the valve piece 55 to engage with and to block or close the second or inward pipe 42 (FIG. 5). The valve piece 55 and the core 61 may be formed integral as a one-piece structure.

Referring next to FIGS. 7-10, the fuel safety control apparatus includes a microprocessor or fuel system safety control device or controller 70 which may be directly or indirectly coupled to an impact detector 81 for receiving an impact signal from the impact detector 81, in which the impact detector 81 is typically coupled to a passenger restraint system controller 82 and/or a firing circuit 83 which may receive the impact signal from the passenger restraint system controller 82 in order to actuate or operate such as the air bags or seat belt tensioning devices (not shown). A typical engine detector 84, an engine controller 85, and a fuel nozzle controller 86 may be provided for controlling the vehicle engine 80. The passenger restraint system controller 82 and the firing circuit 83 and the engine detector 84 and the engine controller 85 and the fuel nozzle controller 86 are typical and not related to the present invention and will not be described in further details.

A relay 71 is coupled to the engine controller 85, and another relay 72 is coupled between the fuel system safety controller 70 and the pressure regulator controller 60 for controlling the pressure regulator controller 60, two further relays 73, 74 are coupled to the fuel system safety controller 70, and the fuel pump 2 is coupled to the fuel system safety controller 70 and one of the relays 74, and one or more batteries or a power source 88 is coupled to the relays 71-74 and the pressure regulator controller 60, and the other electric parts or elements, such as the engine controller 85, the fuel system safety controller 70, the fuel pump 2 and the like. It is to be noted that the fuel system safety controller 70 may be directly or indirectly coupled to the impact detector 81 for receiving the impact signal from the impact detector 81 in order to actuate or operate the fuel pump 2 and/or the pressure regulator controller 60.

The fuel system safety controller 70 further includes a transformer circuit 75 coupled to the relay 73, or the transformer circuit 75 is further provided and coupled between the relay 73 and/or the fuel system safety controller 70, in which the transformer circuit 75 may be actuated or operated to change or to increase or to double the voltage of the power source 88 from 12V to 24V (FIG. 9) when the fuel system safety controller 70 receives an impact signal from the impact detector 81, and the relay 73 may selectively switch off the transformer circuit 75 (FIG. 10) when or after the transformer circuit 75 has increased or doubled the voltage of the power source 88 from 12V to 24V for a predetermined time interval, such as few seconds.

Figure 7:
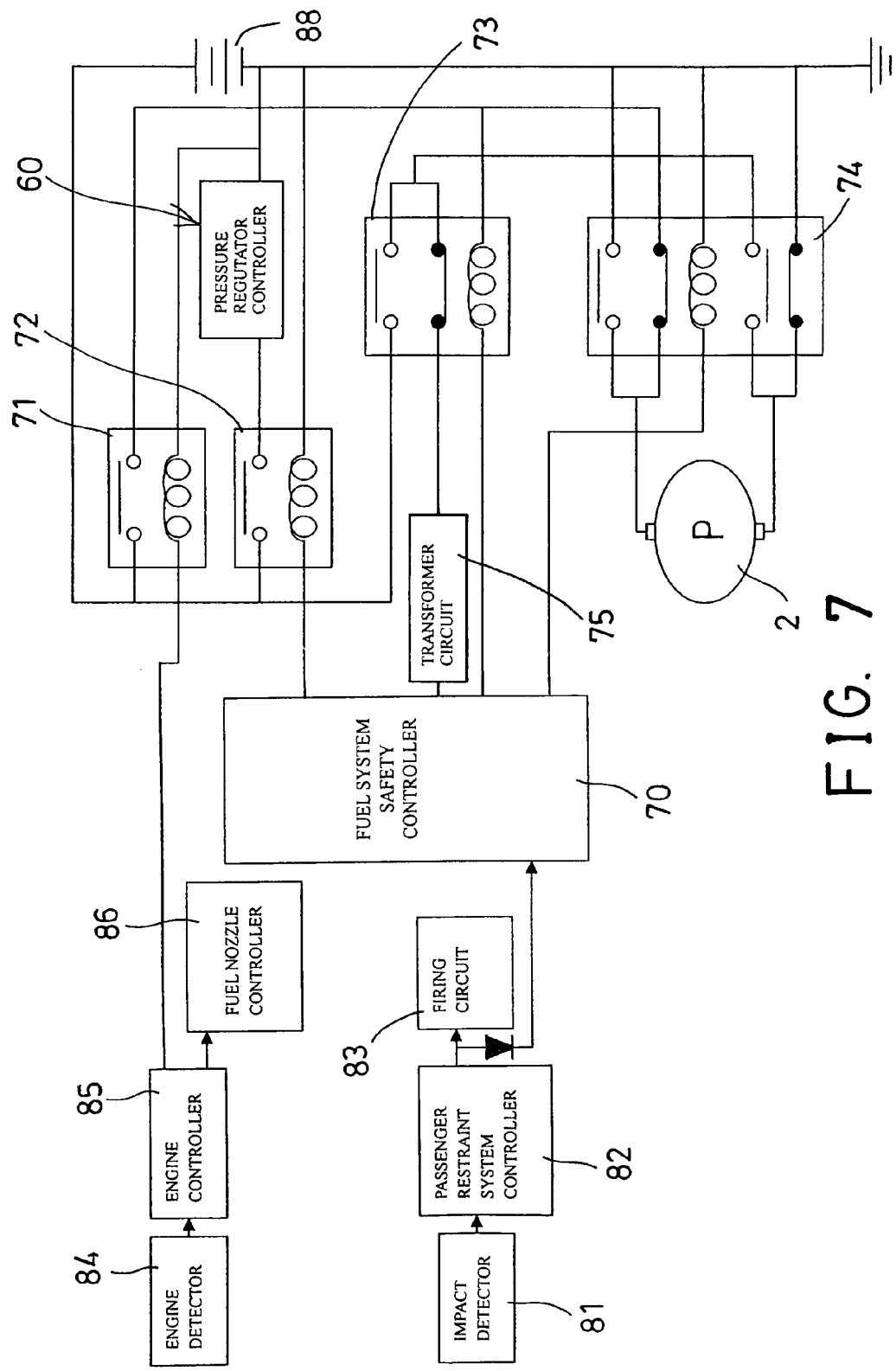
FIG. 7 is a block diagram of the fuel safety control apparatus.
Figure 8:
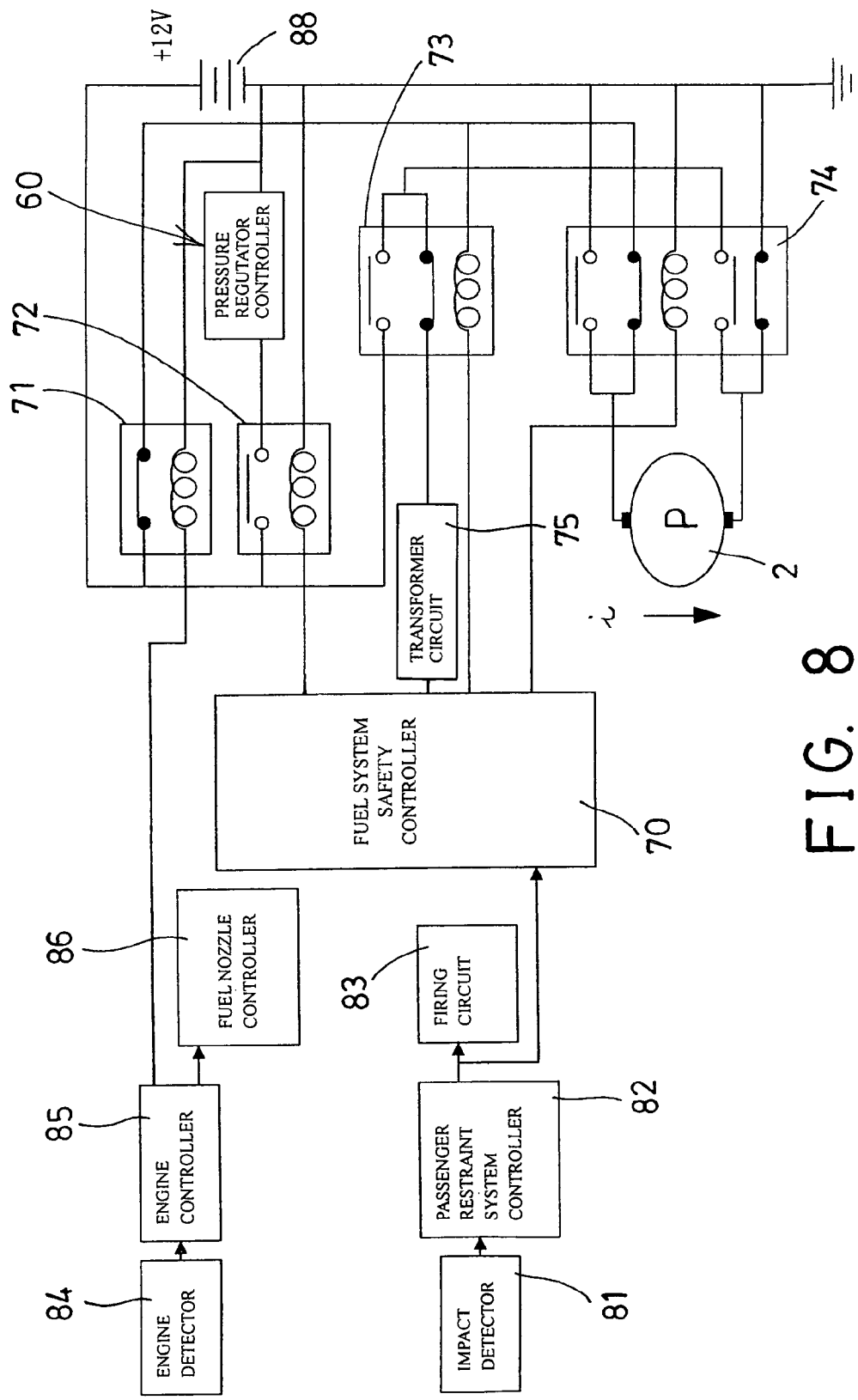
FIGS. 8, 9, 10 are block diagrams similar to FIG. 7, illustrating the operation of the fuel safety control apparatus.

In operation, as shown in FIGS. 7 and 8, the relay 71 may be controlled by the engine controller 85 and/or the fuel system safety controller 70 in order to actuate or operate the power source 88, such as to switch on (FIG. 8) or to switch off (FIGS. 7, 9-10) the power source 88. As shown in FIG. 8, when the power source 88 is switched on, the fuel pump 2 may be energized or actuated or operated to pump and pressurize or supply the fuel 12 to the vehicle engine 80 in the normal vehicle operating condition. At this moment, the pressure regulator controller 60 is switched off, and the valve piece 55 may be biased or forced to engage with the second or inward pipe 42 (FIG. 5) by the spring member 63 and to block or close the second or inward pipe 42, such that the fuel 12 pumped by the fuel pump 2 may be effectively supplied to the vehicle engine 80, but not to the second or inward pipe 42.

Figure 9:
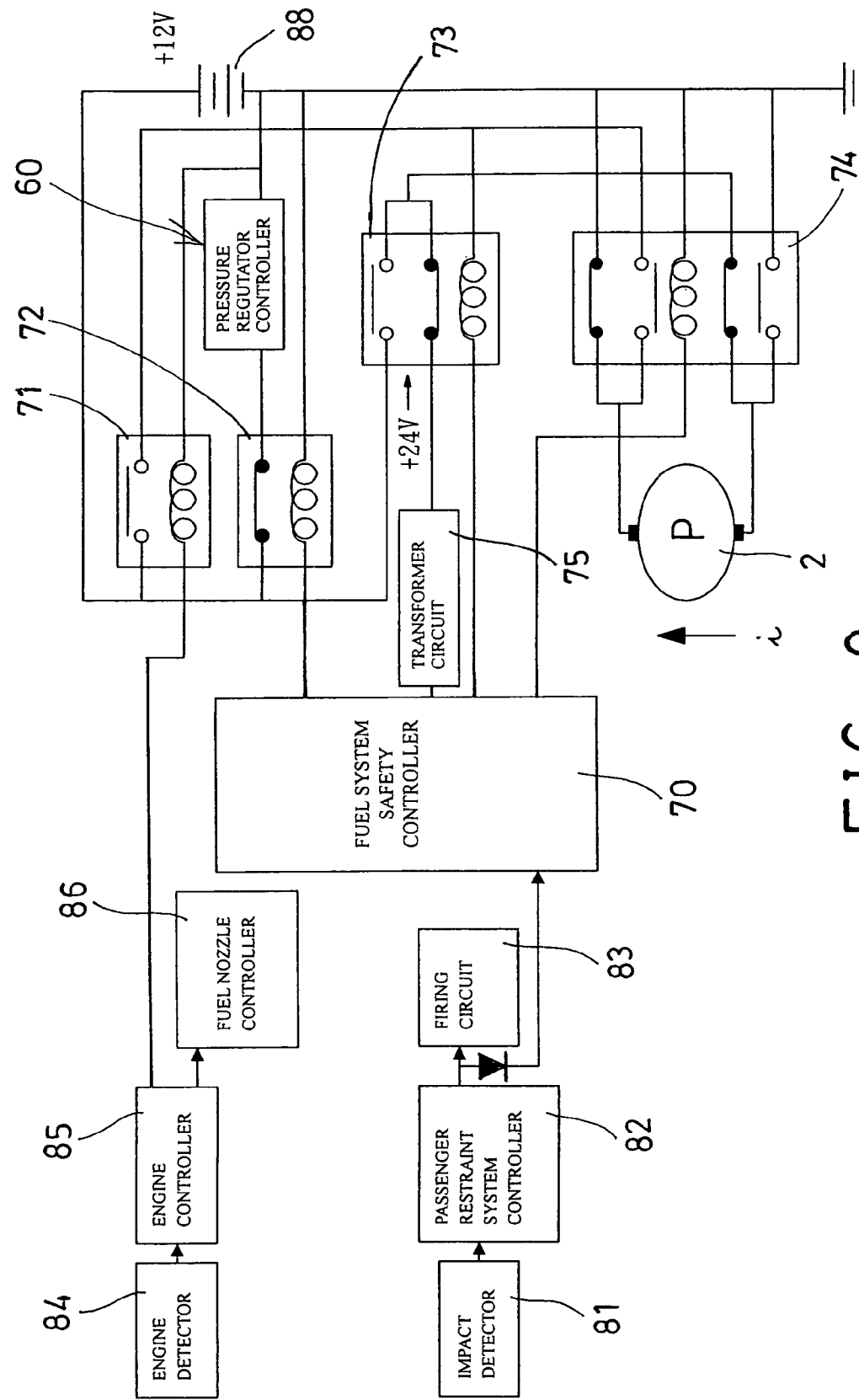
Figure 10:
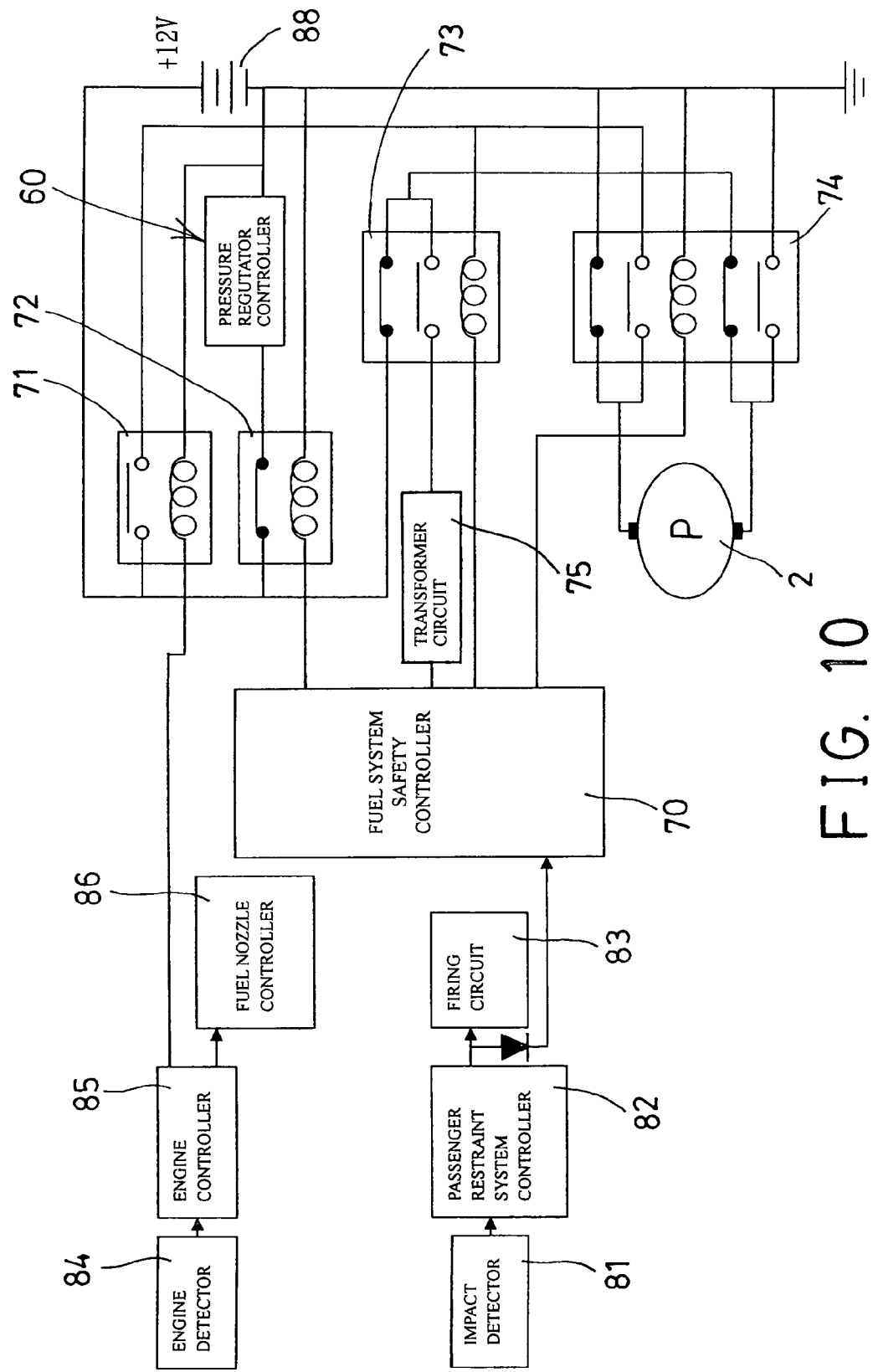

As shown in FIG. 9, when the impact detector 81 detects a vehicle impact or a vehicle crash, or when the impact detector 81 generates and supplies an impact signal to the fuel system safety controller 70, the relays 72, 74 are actuated or operated right away, in which the relay 72 may switch on the pressure regulator controller 60 to attract or to move the valve piece 55 away from the second or inward pipe 42 (FIG. 6) and to allow the fuel 12 to flow through the second or inward pipe 42 and then to be drawn and flown back into the compartment 21 of the housing 20 by the impeller 22 of the fuel pump 2, and the fuel system safety controller 70 and/or the other relay 74 may be actuated or operated to change the current i supplied to the fuel pump 2, or to change or to reverse the driving direction of the fuel pump 2 in order to actuate or operate the fuel pump 2 to return or draw the fuel 12 from the fuel piping system 40 back to the fuel pump 2 and then to the fuel tank 10.

At this moment, as shown in FIG. 4, the fuel 12 in the second or inward pipe 42 and the first or outward pipe 41 may be drawn back through the manifold 46 and the third or return pipe 45 and into the compartment 21 of the housing 20 and then into the chamber 11 of the fuel tank 10 by the impeller 22. The check valve 31 may selectively block or close the outlet port 29 of the housing 20, and the free end 43 of the second or inward pipe 42 may be selectively blocked or closed by the other check valve 44 for allowing the fuel 12 in the first or outward pipe 41 and the second or inward pipe 42 of the fuel piping system 40 to be effectively pumped or drawn in both the opposite directions (FIG. 11) through the manifold 46 and the third or return pipe 45 and then into the compartment 21 of the housing 20 and thus for preventing the fuel 12 from leaking through the orifices 48 of the fuel piping system 40.

Simultaneously, when the fuel system safety controller 70 receives an impact signal from the impact detector 81, the fuel system safety controller 70 may actuate or operate the transformer circuit 75 to change or to increase or to double the voltage of the power source 88 from 12V to 24V (FIG. 9), and the increased voltage (24V) may increase the rotational speed of the fuel pump 2 in order to quickly return or draw the fuel 12 from the fuel piping system 40 back to the fuel pump 2 and then to the fuel tank 10. However, the fuel pump 2 may not be operated in such high speed for a long time, and the relay 73 may then be actuated or switched off (FIG. 10) and operated to switch off the transformer circuit 75 after the transformer circuit 75 has increased or doubled the voltage of the power source 88 from 12V to 24V for a predetermined time interval, such as few seconds, and to prevent the fuel pump 2 from being overheated or damaged.

At this moment or when the transformer circuit 75 has been switched off (FIG. 10), the fuel pump 2 may still be energized by the power source 88 and the other relay 74 may still be actuated or operated to change the current i supplied to the fuel pump 2 and to change or to reverse the driving direction of the fuel pump 2 in order to actuate or operate the fuel pump 2 to return or draw the fuel 12 from the fuel piping system 40 back to the fuel pump 2 and then to the fuel tank 10. After the fuel 12 in the fuel piping system 40 has been drawn back into the fuel pump 2 and into the fuel tank 10, no fuel may further be supplied to the vehicle engine 80, and the vehicle engine 80 may then be stopped due to lack of fuel and may be prevented from being started again inadvertently.

In addition, when or after the fuel 12 in the fuel piping system 40 has been drawn back into the fuel pump 2 and into the fuel tank 10, the relay 71 may be switched off (FIGS. 9, 10) to switch off the power supplied from the power source 88 to the fuel pump 2, and to further prevent the vehicle engine 80 from being started again inadvertently. It is to be noted that the fuel system safety controller 70 may actuate or operate the fuel pump 2 to return or draw the fuel 12 from the fuel piping system 40 back to the fuel pump 2 and then to the fuel tank 10 when the fuel system safety controller 70 receives an impact signal from the impact detector 81. The typical fuel control modules for the vehicles failed to provide a fuel system safety controller to actuate the fuel pump 2 to return or draw the fuel 12 from the fuel piping system 40 back to the fuel pump 2 and then to the fuel tank 10 when the fuel system safety controller receives an impact signal.

Accordingly, the fuel safety control apparatus in accordance with the present invention includes a safety device for returning or drawing the fuel from the fuel piping or tubing system back to the fuel tank when a vehicle impact is occurred and for preventing the impact firing from being occurred or generated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A fuel safety control apparatus comprising:
    a fuel tank including a chamber formed therein for receiving a fuel therein,
    a fuel pump disposed in said chamber of said fuel tank and coupled to a vehicle engine with a fuel piping system for pumping the fuel to the vehicle engine,
    a fuel system safety controller coupled to said fuel pump for controlling and changing a driving direction of said fuel pump, and
    an impact detector coupled to said fuel system safety controller for selectively supplying an impact signal to said fuel system safety controller and to reverse the driving direction of said fuel pump, and to draw the fuel from said fuel piping system back to said fuel tank when a vehicle impact is occurred.

2. The fuel safety control apparatus as claimed in claim 1, wherein said fuel pump includes a housing having a compartment formed therein, and having an inlet port communicating with said compartment of said housing for allowing the fuel in said chamber of said fuel tank to be drawn into said compartment of said housing, an impeller rotatably disposed in said compartment of said housing for pumping the fuel into and out of said housing, and said housing includes an outlet port coupled to the vehicle engine with said fuel piping system.

3. The fuel safety control apparatus as claimed in claim 2, wherein said housing includes a first opening formed therein and communicating with said compartment of said housing, and said fuel piping system includes a first pipe coupled to said outlet port of said housing and coupled to the vehicle engine, and includes a manifold coupled between said first pipe and said first opening of said housing for allowing the fuel to be selectively drawn back from said first pipe into said compartment of said housing.

4. The fuel safety control apparatus as claimed in claim 3, wherein said fuel piping system includes a second pipe coupled to the vehicle engine and having a free end engaged into said chamber of said fuel tank for selectively supplying the fuel back into said chamber of said fuel tank.

5. The fuel safety control apparatus as claimed in claim 4, wherein said housing includes a second opening formed therein and communicating with said compartment of said housing, and said fuel piping system includes a third pipe coupled between said second pipe and said second opening of said housing for allowing the fuel to be drawn back from said second pipe into said compartment of said housing.

6. The fuel safety control apparatus as claimed in claim 5, wherein said housing includes a valve seat formed therein and communicating with said compartment of said housing and said first and said second openings of said housing, and a valve member for selectively engaging with said valve seat and for selectively blocking and closing said first and said second openings of said housing.

7. The fuel safety control apparatus as claimed in claim 4, wherein said fuel piping system includes a check valve engaged in said free end of said second pipe for selectively blocking and closing said free end of said second pipe and for preventing the fuel from flowing back into said second pipe from said chamber of said fuel tank.

8. The fuel safety control apparatus as claimed in claim 4, wherein said fuel piping system includes a pressure regulator coupled between the vehicle engine and said second pipe for controlling the fuel to flow into said second pipe.

9. The fuel safety control apparatus as claimed in claim 8, wherein said pressure regulator includes a casing having a space formed therein, said first pipe and said second pipe are coupled to said space of said casing for allowing the fuel to selectively flow from said first pipe to said second pipe, a valve piece, and a pressure regulator controller for actuating said valve piece to control the fuel to flow from said first pipe to said second pipe.

10. The fuel safety control apparatus as claimed in claim 9, wherein said pressure regulator includes a flexible membrane disposed in said casing, said valve piece is attached to said flexible membrane for selectively blocking said second pipe.

11. The fuel safety control apparatus as claimed in claim 10, wherein said pressure regulator includes a spring member disposed in said casing and engaged with said flexible membrane for forcing said valve piece to engage with said second pipe.

12. The fuel safety control apparatus as claimed in claim 9, wherein said pressure regulator controller includes a core disposed in said casing and aligned with said valve piece, and a coil engaged around said core for actuating said core to attract and to move said valve piece relative to said second pipe.

13. The fuel safety control apparatus as claimed in claim 9, wherein a relay is coupled between said pressure regulator controller and said fuel system safety controller for controlling said pressure regulator controller to actuate said valve piece.

14. The fuel safety control apparatus as claimed in claim 2, wherein said housing includes a check valve engaged in said outlet port of said housing for selectively blocking and closing said outlet port of said housing.

15. The fuel safety control apparatus as claimed in claim 1, wherein a relay is coupled between said fuel system safety controller and said fuel pump for controlling the driving direction of said fuel pump.

16. The fuel safety control apparatus as claimed in claim 1, wherein said fuel system safety controller includes a transformer circuit coupled to said fuel pump for selectively supplying an increased power to said fuel pump, and a relay coupled to said transformer circuit for selectively switching off said transformer circuit.

* * * * *